United States Patent Office 3,393,187
Patented July 16, 1968

3,393,187
CHLOROPRENE POLYMERIZATION PROCESS
Chester Arthur Hargreaves II, and Thomas Lawrence Pugh, Wilmington, Del., assignors to E. I. du Pont de Nemours and Company, Wilmington, Del., a corporation of Delaware
No Drawing. Filed Apr. 12, 1963, Ser. No. 272,513
3 Claims. (Cl. 260—92.3)

This invention relates to a novel process for preparing high molecular weight polychloroprene. More particularly this invention relates to a process for preparing high molecular weight polychloroprene which can be greatly extended with portions of oil and their highly extended oil products.

Polychloroprene is outstanding for its ability to be advantageously extended with proportions of oils and has long been used in this way. Still further advances to give higher molecular weight polychloroprene would further increase its utility on the one hand by making it possible to increase the proportion of oil and thereby reducing the cost of the compound without impairing the properties. On the other hand, it would make it possible, while using a formulation of higher molecular weight polychloroprene of the same cost, to obtain improved properties. Still further improvement of properties of polychloroprene would result from higher molecular weight polychloroprene if the oil were omitted. The polychloroprene produced by the presently available methods yield polychloroprene of number-average molecular weight of about $4 \times 10^5$ which limits the degree of oil extension of the polymer. While the known methods produce slight amounts of higher molecular weight polychloroprene, the small amounts produced and difficulty of isolation make the usefulness of these processes both impractical and uneconomical.

It is an object of this invention to provide a novel process for the preparation of substantially gel free high molecular weight polychloroprene. Another object is to provide high molecular weight polychloroprene which is easily extended with large quantities of oil. Other objects will appear hereinafter.

These and other objects are accomplished by an improved process for the polymerization of chloroprene in an alkaline aqueous emulsion which comprises carrying out the polymerization at a temperature below about 22° C. in the presence of about $3 \times 10^{-4}$ to $4 \times 10^{-4}$ gram moles per 100 grams of chloroprene of a chain transfer agent, and arresting the polymerization after about 67 to 73 percent of the chloroprene has polymerized thereby obtaining a substantially gel free polychloroprene polymer having a number-average molecular weight of about $8 \times 10^5$. After removing the unreacted polychloroprene, the aqueous dispersion of the polychloroprene can be blended with a water emulsion containing about 20 to 40 percent by weight of the polychloroprene of hydrocarbon oils of low volatility such as aromatic petroleum oils and then the blended polychloroprene which has been oil extended can be isolated from the aqueous dispersion. Alternatively, the polychloroprene can be isolated from the alkaline aqueous dispersion and then blended with about 20 to 40 percent by weight of the polychloroprene of hydrocarbon oils. A convenient method for isolating the polychloroprene from the alkaline aqueous dispersion either before oil extension or after oil extension in the aqueous emulsion is by acidification and freezing as described in U.S. Patent 2,187,146.

The polychloroprenes of this invention have very high number average molecular weights of at least about 800,000. This is twice as high as the number average molecular weight of the highest polychloroprene hitherto made directly by polymerization. Polychloroprenes of molecular weight above 800,000 have up to now been formed only in small proportions (less than 5%) along with polymers of lower molecular weight and had to be isolated by dissolving the mixed high and low polychloroprenes in benzene and precipitating the material of highest molecular weight by controlled addition of methanol.

The high molecular weight polymers of this invention are free from gel polymer, that is, they are completely soluble in aromatic hydrocarbon solvents at ordinary temperatures. Prior attempts to polymerize chloroprene to give substantial quantities of high molecular weight, i.e. above 400,000, polymers have been ineffective and often gave gel polymers which were impossible to be readily mixed with oil to give a homogeneous blend by means of available equipment such as Banbury mixers. When the improved process described above is used, the substantially gel-free, soluble polychloroprene of number average molecular weight above about 800,000 is produced in normal 70% yields by the familiar emulsion polymerization techniques such as the process of U.S. Patent 2,567,117. The conditions of this improved process are critical and, if these conditions are not met, the product is either too low in molecular weight or contains gel polymers.

Gel is defined and determined in the following manner: approximately 0.5 gram of polymer plus 50.0 cc. of benzene are allowed to stand overnight after which the samples are shaken gently for 1 hour. The gel is allowed to settle or is centrifuged out. Ten (10.0) cc. are removed by a pipette and evaporated by dryness. The percent gel is calculated by difference:

percent gel = $(0.2S - P) \times 100/S$ where P is the polymer weight found in the evaporation and S is the original weight polymer added to the benzene. If $0.2S = P$, no gel is present.

Although the high molecular weight polychloroprene prepared by the present invention is of primary importance when extended with hydrocarbon oils of low volatility, these polymers are also useful without oil extension, as shown in the examples. Furthermore, they exhibit outstanding properties when extended with other oils such as selected animal and vegetable glycerides and rosin oils.

The procedure used for carrying out the polymerization and isolation, with the exception of the improvement of this invention, is the well-known alkaline emulsion polymerization in the presence of mercaptans, many forms of which process have often been described in patent and journal literature and are applicable here. Recent variations of the prior art which are applicable to the present invention are (1) the use of emulsifying agents which are largely ammonium soaps, followed by drum drying of the latex at temperatures which decompose these ammonium soaps and thus make a washing step unnecessary (see U.S. 2,914,497) and (2) chemically coagulating the latex in thin, continuous sheets suitable for washing and drying.

The preferred chain transfer agent (modifying agent or polymerization regulator) is dodecyl mercaptan when used in the prescribed amounts which equals about 0.06 to 0.08 percent by weight of the mercaptan per 100 grams of chloroprene. Other aliphatic mercaptans, particularly those containing 8 to 18 carbon atoms, can also be used. The mercaptans can be straight chained or branched, primary, secondary or tertiary; however, the straight chain, primary (e.g. n-dodecyl) mercaptans are preferred. Other chain transfer agents known by one skilled in the art to be effective chain transfer agents such as aromatic disulfides, alkyl xanthogen disulfides, etc. are also useful in the improved process.

When a hydrocarbon oil is used for extending the polychloroprene produced according to the present invention, it should be highly aromatic and of such low volatility as would lead to no substantial loss during processing and in use. The preferred oils have flash points above 400° F. and have 38 to 45% of their carbon atoms in aromatic rings, 13–22% of them in naphthenic rings, and 37–43% in paraffinic chains. Their viscosity at 210° F. (SUS) is 80 to 150 and their viscosity-gravity constant 0.925 to 0.945.

The compounding and curing of the polymers made according to the present invention is along the lines long established for curing the common polychloroprenes except that practical stocks can be obtained with much larger proportions of oils and also of fillers and reinforcing agents such as the carbon blacks and clays.

The oil extended high molecular weight polychloroprenes prepared by this invention are useful for many applications such as electric wire insulation, hose covering and for weather strips used around the windshield of automobiles.

The following examples will better illustrate the nature of the present invention; however, the invention is not intended to be limited to these examples. Parts are by weight unless otherwise indicated.

EXAMPLE 1

A polychloroprene latex is made by dissolving 3 parts by weight of disproportionated rosin and 0.000371 gram mole of n-dodecyl mercaptan in 100 parts of chloroprene, dispersing this by intensive agitation in 108.9 parts of water containing 0.55 part of sodium hydroxide, 0.40 part of the sodium salts of sulfonated dinaphthylmethane, and 0.30 part of sodium sulfite and then polymerizing with efficient cooling at 20° C. This polymerization is initiated by adding a water solution containing 5.6% potassium persulfate and 0.15% of the sodium salt of anthraquinone betasulfonic acid and maintained by adding, as needed, a water solution containing 0.35% potassium persulfate and 0.0175% sodium salt of anthraquinone betasulfonic acid. The polymerization is stopped when 70% of the chloroprene has polymerized, as shown by the density of the partly polymerized emulsion, by adding a toluene solution of 0.028 part of p-tertiary butyl catechol and 0.028 part of thiodiphenylamine dispersed in water containing as dispersing agents the sodium salts of dinaphthylmethanesulfonic acids and the sodium sulfates of fatty alcohols containing 12 to 14 carbon atoms. The unchanged chloroprene is then removed by steam distillation at reduced pressure. (See U.S. 2,467,769.) The polymer is then isolated from the resulting latex by acidifying to pH 5.6, continuously freezing in thin layers as in U.S. 2,187,146, washing and drying. The polychloroprene thus prepared has a Mooney viscosity determined according to ASTM D–927–55T, using the small rotor at 100° C. of 80 (equivalent to about 150 determined with the usual large rotor). It is soluble in benzene and toluene. Its number average molecular weight is about 800,000.

Examples of other suitable catalyst and arresting agents used in the above process can be found in U.S. Patent 2,567,117.

EXAMPLE 2

The polymer of Example 1 is extended with oil by mixing the latex made therein, after removal of the unchanged chloroprene but before acidification, with a water dispersion of an aromatic oil made by agitating 100 parts of the oil containing 2 parts of disproportionated rosin in 57.9 parts of water containing 0.14 part of sodium hydroxide and 1.0 part of the above sodium salts of sulfonated dinaphthylmethane. This dispersion is mixed with the latex in the proportions required to give 30 parts of oil per 100 parts of the polychloroprene. The nature of the oil, in terms of the pertinent commonly determined constants, is as follows:

| | |
|---|---|
| Specific gravity (60° F.) | 0.9752 |
| Flash point (° F.) | 420 |
| Fire point (° F.) | 475 |
| Viscosity (at 100° F.) | 3200.0 |
| Viscosity (at 210° F.) | 85 |
| Refractive index (at 20° C.) | 1.5538 |
| Aniline point (° F.) | 122 |
| Volatile loss (22 hrs. at 225° F., percent) | 0.3 |
| Viscosity-gravity constant | 0.925 |
| Distillation range (90%, ° F.) | 775–895 |
| Carbon atoms in aromatic rings (percent) | 38 |
| Carbon atoms in naphthenic rings | 22 |
| Carbon atoms in paraffin chains | 40 |

The pH of the mixture is then adjusted to 6.3 and the oil-extended elastomer is isolated as described above for the unextended material of Example 1. The dried product has a Mooney viscosity determined with the usual large rotor (ML) of 85 at 100° C.

Other blending oils of similar characteristics are commercially available.

The products of Examples 1 and 2 are compared in the following tables with a related polychloroprene representative of those known in the prior art and often extended with moderate or large proportions of oil, made by emulsion polymerization of chloroprene in the presence of 0.14% (0.0007 gram mole) of normal dodecyl mercaptan, at 40° C. In Table I the compounding ingredients, exclusive of extending oil, are 50 parts of semi-reinforcing carbon black, 1 part of phenyl betanaphthylamine, 4 parts of magnesium oxide, 5 parts of zinc oxide, and 0.7 part of 2-mercaptoimidazoline per 100 parts of polychloroprene. The stocks are cured for 30 minutes at 153° C. In Table II all compounds contain per 100 parts of polychloroprene, 0.5 part of stearic acid, 2.0 parts of mixed phenyl betanaphthylamine and N,N'-diphenyl p-phenylene diamine, 4.0 parts of magnesium oxide, 0.5 part each of petrolatum and microcrystalline paraffins, 5 parts of zinc oxide, 1.0 part of 2-mercaptoimidazoline and 1.0 part of sulfur along with various amounts of semi-reinforcing carbon black and of the aromatic extending oil described above. The stocks are cured for 30 minutes at 153° C.

TABLE I

| Stock number | 1 | 2 | 3 |
|---|---|---|---|
| Polychloroprene (parts by weight): | | | |
| Made in Example 1 | 100 | | |
| Made in Example 2 | | [1] 100 | |
| Made with 0.14% dodecyl mercaptan (0.0007 gram mole as in prior art | | | 100 |
| Modulus, 400% elongation | 3,700 | 1,300 | 2,775 |
| Elongation at break | 430 | 740 | 410 |
| Tensile strength | 3,800 | 3,100 | 2,800 |

[1] The 30 parts of oil contained in the extended polymer made in Example 2 is not included in this figure.

TABLE II

| Stock Number | 1 | 2 | 3 | 4 |
|---|---|---|---|---|
| Polychloroprene from Example 2 [1] | [2] 100 | [2] 100 | | |
| Polychloroprene made with 0.14% dodecyl mercaptan (0.0007 gram mole) | | | 100 | 100 |
| Oil [1] | [3] 80 | [3] 110 | 80 | 110 |
| Carbon black (SRF) [1] | 130 | 170 | 130 | 170 |
| Modulus, 200% elongation | 1,500 | 1,400 | 1,500 | 1,420 |
| Elongation at break | 340 | 300 | 290 | 270 |
| Tensile strength | 2,325 | 1,950 | 2,025 | 1,775 |

[1] Parts by weight.
[2] The 30 parts of oil contained in the extended polymer made in Example 2 is not included in this figure.
[3] Includes 30 parts of oil incorporated in Example 2.

In Table I, it is shown that polychloroprene made at 20° C. with 0.000371 gram mole of dodecyl mercaptan and 70% conversion according to the present invention (Example 1) gives very high modulus and tensile strength when compounded and cured without extension with oil (stock 1), much higher than is given by the polymer made according to the prior art with 0.14% (.0007 gram mole) of dodecyl mercaptan (stock 3), and that even when the product of Example 1 is blended as in Example 2 with 30% of oil, it gives a higher tensile strength (stock 2) than the unextended prior art polymer in stock 3.

In Table II, stocks 1 and 2 illustrate the compounding of the polychloroprene blend of Example 2 with more oil and with carbon black, giving vulcanizates of good properties in spite of these large additions. In comparison, the prior art polychloroprene of stocks 3 and 4, similarly compounded, are much inferior in vulcanizate properties, particularly tensile strength.

EXAMPLE 3

An oil-extended product very similar to that made in Example 2 results when the unextended polymer made in Example 1 is kneaded in a Banbury mixer with the same proportion of the same aromatic oil and other compounding ingredients used in Example 2 for 8 minutes at 110° C. When compounded and cured like the other materials in Table I, it gives results much like those given by stock 2 of Table I.

EXAMPLE 4

The polymerization is carried out as in Example 1, except that the catalyst solution added is a 1% solution of potassium ferricyanide in water. In order to avoid a slight greenish discoloration in the isolated polymer, 1.45 parts of a 3% hydrogen peroxide solution is added to the latex after the removal of the unused chloroprene and after acidification.

The polymer is then isolated as in Example 1 and is practically the same as the product of that example.

EXAMPLE 5

The product of Example 4 may be extended with oil, emulsified with somewhat different emulsifiers from those used in Example 2.

100 parts of the aromatic oil used in Example 2 is dispersed in 55.6 parts of water containing 2.14 parts of the sodium salt of disproportionated rosin and 1.0 part of the sodium salt of sulfonated dinaphthylmethane. This dispersion is then mixed with the polychloroprene latex prepared in Example 4 in such proportions so as to give 30 parts of oil for 100 parts of polychloroprene. The mixture is first treated with 3.47 parts of sodium lauryl sulfate and is then acidified with acetic acid to pH 6.3.

The intimate blend of oil and polychloroprene is then isolated by coagulating, washing, and drying as described above in Example 2 and is very similar to the product of Example 2.

As many widely different embodiments of this invention may be made without departing from the spirit and scope thereof, it is to be understood that this invention is not limited to the specific embodiments thereof except as defined in the appended claims.

What is claimed is:

1. An improvement in the process for the polymerization of chloroprene in an alkaline aqueous emulsion by which a substantially gel-free chloroprene polymer is obtained having a number average molecular weight above about 800,000; which improvement comprises carrying out the polymerization at a temperature below about 22° C. in the presence of about $3 \times 10^{-4}$ to $4 \times 10^{-4}$ gram moles, per 100 grams of chloroprene, of a chain transfer agent and arresting the polymerization after about 67 to 73 percent of said chloroprene has polymerized.

2. A process as described in claim 1 where said chain transfer agent is an aliphatic mercaptan of 8 to 18 carbon atoms.

3. A process as defined in claim 1 wherein said chain transfer agent is dodecyl mercaptan.

References Cited

UNITED STATES PATENTS

| | | | |
|---|---|---|---|
| 3,193,497 | 7/1965 | Bentley | 260—33.6 |
| 2,567,117 | 9/1951 | Moschel | 260—92.3 |
| 2,402,189 | 6/1946 | Soday | 260—33.6 |

OTHER REFERENCES

Synthetic Rubber, Whitby, ed., Wiley and Sons, 1954, TS 1925 W 45. (Copy in Group 150; pages 281, 282 relied on.)

MORRIS LIEBMAN, *Primary Examiner.*

S. L. FOX, J. S. WALDRON, *Assistant Examiners.*